3,809,573
METHOD FOR FINISHING WOVEN AND NON-WOVEN FABRICS FORMED OF POLYESTER MATERIALS
Robert D. Feitlowitz, Ridgewood, N.J., assignor to DHJ Industries, Inc., New York, N.Y.
No Drawing. Continuation-in-part of abandoned application Ser. No. 24,372, Mar. 31, 1970. This application Jan. 31, 1972, Ser. No. 222,313
Int. Cl. B44d 5/00
U.S. Cl. 117—138.8 F
2 Claims

ABSTRACT OF THE DISCLOSURE

A method of finishing woven and non-woven fabrics formed of 100% polyester material to impart an increased level of stiffness which is durable to laundering and dry cleaning consisting of the steps of (a) preparing a mixture of (A) a combination of poly(butyl acrylate), polystyrene and polyacrylic acid, (B) a melamine selected from the group consisting of hexakis hydroxymethyl melamine and alkylated methylolated melamine (C) a strong acid, (D) an emulsion of a glycol phthalate polyester resin, and water (b) impregnating the 100% polyester material with said mixture, (c) drying, (d) thermally curing, (e) heat setting and (f) modifying the resultant fabric stiffness utilization of a button breaking operation.

RELATED APPLICATION

This application is a continuation-in-part of my prior copending application for United States Letters Patent entitled "Composition for Finishing Woven and Nonwoven Fabrics Formed of Polyester Materials" which was filed Mar. 31, 1970, and which bears Ser. No. 24,372, now abandoned.

BACKGROUND AND SUMMARY OF THE INVENTION

In the apparel field polyester fibers such as Dacron (a registered trademark of E. I. Du Pont de Nemours & Co., Inc.) has found wide use. Polyester has been utilized successfully in substantially all forms of fabric construction including nonwoven as well as woven. This acceptance is due to improved resistance to wrinkling and crease or pleat retention during wet weather conditions, greater durability, as well as less work required to wash and otherwise maintain garments in suitable condition for wear.

Various chemical formulations have been utilized in finishing polyester fabrics. The chemical formulations used, however, for the most part, have not been entirely satisfactory in overcoming problems of lack of retention of initial stiffness in the product and also in not overcoming stretch problems during die cutting—without recovery.

I have found that I can obtain an improved product by impregnation of the polyester fabric with a mix containing (A) a stiffening agent such as a melamine, as for example, hexakis(hydroxymethyl) melamine or alkylated methylolated melamine, and (B) a stiffness retaining agent which is a three-part acrylic, (C) a suitable catalyst and (D) an emulsion of polyester resin such as glycol phthalate. Composition (D) contributes bulk, thickness, fullness, anti-static properties, anti-soiling properties and further contributes to dimensional stability.

In the prior art condensates of formaldehyde, such as urea formaldehyde and/or melamine formaldehyde have been used alone in finishing, but this has washed off. Also various acrylics have been used alone, but this has resulted in yellowing of fabric and lack of desirable stiffness.

DESCRIPTION OF THE PREFERRED EMBODIMENT

In the practice of my invention I prepare a bath of component materials (A), (B), (C) and (D) where (A) is a mixture of poly(butyl acrylate), polystyrene and polyacrylic acid. I also include in composition (A) a material to maintain the proper pH for uniform dispersion, such as ammonia ($NH_3$) and a melamine formaldehyde to provide a synergistic effect. I have found that an appropriate mix would contain by weight 33% poly(butylacrylate), 16% polystyrene, 9% polyacrylic acid, 2.0 to 2.5% ammonia and 7% melamine formaldehyde. The remainder is water.

Composition B is a melamine, such as hexakis (hydroxymethyl) melamine or alkylated methylolated melamine, and (C) is a suitable catalyst, such as paratoluene sulfonic acid. Composition D is an emulsion of polyester resin such as glycol phthalate and a compatible emulsifying agent as for example ethoxylated nonyl phenol or coconut amide.

I mix the quantities of materials (A), (B), (C) and (D) together in accordance with the following two examples:

EXAMPLE 1

| Composition: | Percent on the weight of the bath |
|---|---|
| (A) | 1.25 |
| (B) | 1.5 |
| (C) | 0.36 |
| (D) | 10.0 |

EXAMPLE 2

| Composition: | Percent on the weight of the bath |
|---|---|
| (A) | 2.5 |
| (B) | 3 |
| (C) | 0.36 |
| (D) | 10.0 |

It has been found that the ingredients in either of the examples with respect to Composition A, B, C and D can vary to 50% below the given amount to 25% above.

In the practice of my invention the material or fabrics to be finished is generally brought to a tenter frame or a drum. Upon mounting on the tenter frame, in accordance with established practices, the material is first thoroughly impregnated with the composition, then dried, cured and heat-set and then sent through a button breaker and then wound on a second drum.

In one manner of practicing the invention an oven is set at 460° F. and as the fabric passes through the oven it goes through a heat range suitable to the operation. It is impregnated at room temperature and brought from room temperature to a suitable temperature to dry the fabric. Curing takes place at approximately 375° F. and at approximately 450° F. the material is heat set. The fabric is passed through the button breaker after heat setting since the material is very stiff coming off the tenter frame. It is desirable to have this stiffness. However, the button breaker is utilized to reduce the stiffness and develop the proper hand. Smoothness and sufficient dimensional stability are achieved by the exposure to heat and the utilization of the materials set forth above in the quantities given. The resulting fabric will retain its initial stiffness as determined to the extent of the utilization of the button breaker and will be dimensionally stable, that is, during subsequent operations wherein the fabric is stretched it will return to the proper dimensions, that is, it will have achieved recovery of dimensions.

I claim:
1. The method of finishing woven and nonwoven fabrics formed of 100% polyester material to impart an in- creased level of stiffness and have the resultant stiffness durable to laundering and dry cleaning consisting of the steps of (a) preparing a mixture of products (A), (B), (C) and (D) where (A) is a combination of poly(butyl acrylate), polystyrene and polyacrylic acid, (B) is selected from the group consisting of hexakis(hydroxymethyl) melamine and alkylated methylolated melamine, (C) is a strong acid and (D) is an emulsion of a glycol phthalate polyester resin and the remainder is water, (b) thoroughly impregnating the fabric with said mixture, (c) drying, (d) thermally curing, (e) heat setting and (f) modifying the resultant fabric stiffness by utilization of a button breaking operation.

2. The method of claim 1 in which (A) additionally contains ammonia and a melamine formaldehyde.

References Cited

UNITED STATES PATENTS

| | | | |
|---|---|---|---|
| 2,231,549 | 2/1941 | Rockett | 117—11 X |
| 2,819,179 | 1/1958 | Barnard et al. | 117—139.5 X |
| 3,052,570 | 9/1962 | Polansky et al. | 117—139.4 |
| 3,220,869 | 11/1965 | Ruemens et al. | 117—139.4 |
| 3,322,569 | 5/1967 | Faulbaker et al. | 117—139.4 |
| 3,377,249 | 4/1968 | Marco | 8—115.6 |
| 3,382,086 | 5/1968 | Singleton | 117—138.8 |
| 3,394,024 | 7/1968 | Nachbur et al. | 117—138.8 |
| 3,420,702 | 1/1969 | Spangler | 117—139.5 X |
| 3,459,716 | 8/1969 | Schaefer et al. | 117—138.8 |
| 2,690,404 | 9/1954 | Spangler et al. | 117—139.4 X |

WILLIAM D. MARTIN, Primary Examiner

S. L. CHILDS, Assistant Examiner

U.S. Cl. X.R.

117—11, 139.4, 139.5 A